United States Patent Office 3,040,090
Patented June 19, 1962

3,040,090
PROCESSES OF MAKING OXYGENATED ORGANIC COMPOUNDS
Thomas Alderson, Wilmington, and John Cunningham Thomas, Hockessin, Del., assignors to E. I. du Pont de Nemours and Company, Wilmington, Del., a corporation of Delaware
No Drawing. Filed Apr. 14, 1959, Ser. No. 806,218
21 Claims. (Cl. 260—483)

This invention relates to an improved method for preparing organic oxy compounds.

The reaction of olefins with carbon monoxide and hydrogen to form mixtures of oxygenated organic compounds has been the subject of extensive investigations. The type of product obtained, as well as the product distribution, in this reaction is markedly affected by the process conditions and catalyst used. For example, in the presence of zinc chromate at 300° C. and 150–250 atmospheres, the product consists primarily of methanol and hydrocarbons with aldehydes and higher alcohols present in very small amounts. If the pressure and temperature are reduced, respectively, to atmospheric and 206–245° C., and if the catalyst is a cobalt-copper-manganese oxide mixture, the product is then methanol-free. Increasing the temperature to 500° C. and the pressure to 150 atmospheres results in formation of hydrocarbons, higher alcohols, and ketones. Using a substantial excess of hydrogen, a hydrogenation catalyst, temperatures of 75–200° C., and pressure of 325–1000 atmospheres, the reaction is selectively directed to propionaldehyde formation. In all of these prior methods hydrogen has been an essential initial reactant.

The present invention concerns a new method for producing oxygenated organic compounds from carbon monoxide, an ethylenically unsaturated compound, and a hydroxylic compound. In this new method the reaction is carried out in the presence of a catalyst which is a chelate of a noble metal of group VIII.

According to this invention, oxygenated organic compounds are obtained by reacting under pressure an ethylenically unsaturated compound with carbon monoxide and a hydroxylic compound at a temperature above 100° C. in the presence of a catalyst which is a chelate of a group VIII noble metal of atomic number 44 through 78.

In one embodiment, a reactor is charged with normally liquid hydroxylic compound and catalyst, cooled, evacuated, ethylenically unsaturated compound is added, and carbon monoxide is then injected so that at reaction temperature the pressure is above 100 atmospheres. The charge is maintained at reaction temperature and pressure until reaction is complete, as evidenced by cessation of pressure drop. Thereafter, the reaction mixture is allowed to cool, the reactor is opened, and the contents discharged. The desired reaction products are isolated by distillation or other methods known to those skilled in the art.

In another embodiment, the reactor is charged with the normally liquid hydroxylic reactant and catalyst, thereafter pressured with a mixture of carbon monoxide and ethylenically unsaturated compound, and the charge is then heated and maintained at the temperature and pressure selected for operation. After reaction is complete, the reactor is opened, discharged, and the product processed as previously described.

The examples which follow are submitted to illustrate and not to limit this invention. Unless otherwise stated, parts are by weight and the reactor employed has a capacity of 400 parts by weight of water.

EXAMPLE I

A pressure reactor (capacity—400 parts by weight of water) was charged with 100 parts of water and one part of ruthenium (III) acetylacetonate. The reactor was cooled, evacuated, and pressured with a 1:1 molar ratio carbon monoxide:ethylene mixture. The charge was heated at 190° C. and at 1000 atmospheres pressure for 16 hours. The reactor was repressured as necessary with the gaseous mixture to maintain the pressure at about 1000 atmospheres. During the 16-hour period there was a pressure drop of 1160 atmospheres.

There was removed from the reactor 155 parts of two-phase liquid, which was distilled rapidly through a short distilling column. In this distillation there was obtained 46 parts of organic liquid products, which boiled at 30° C./12 mm. and had refractive index of $n_D^{25}$ of 1.3909. In addition there was obtained 17 parts of 3,6-octanedione. The organic liquid products were fractionally distilled to yield 15 parts of diethyl ketone, B.P. 102° C.; $n_D^{25}$, 1.3910, 3 parts of propionic acid and 3 parts of 3,6-octanedione, B.P. 205–220° C.; $n_D^{25}$, 1.4330. These products were identified by infrared analysis.

Table I summarizes a series of runs carried out as described in Example I. In Examples II through IV the reactor was pressured with a mixture of carbon monoxide and ethylene in a 1:1 molar ratio and was maintained during the reaction at 1000 atm. pressure, excepting for Example II where it was kept between 900 and 1000 atm. In the remaining examples, the reactor was charged with the ethylenically unsaturated monomer and then pressured with carbon monoxide to the indicated level. The reaction time was 16 hours for the runs listed. For Examples II–XII, the hydroxylic compound involved was water and 100 parts were used. Examples XIII–XXVII were conducted with methanol and employed 79 parts of this hydroxylated compound.

*Table I*

| Example | CO Pressure, Atm. | Temp., °C. | Total Pressure Drop, Atm. | Catalyst Nature | Catalyst Parts | Ethylenically Unsaturated Compound Nature | Ethylenically Unsaturated Compound Parts | Reaction Products |
|---|---|---|---|---|---|---|---|---|
| II | | 190 | 1,730 | Rhodium (III) acetylacetonate. | 1 | Ethylene | | 107 parts diethyl ketone, B.P. 102° C.; $n_D^{25}$, 1.3890; 27 parts 3,6-octanedione, M.P. 28–32° C., B.P. 260° C.; $n_D^{25}$, 1.4330. |
| III | | 225 | 1,270–1,275 | Ruthenium (III) acetylacetonate. | 0.5 | do | | 55 parts diethyl ketone-water azeotrope, B.P. 86.5° C.; $n_D^{25}$, 1.3903; 60 parts propionic acid, B.P. 143–144° C.; $n_D^{25}$, 1.3912–1.4219; 32 parts material chiefly 3,6-octanedione, B.P. 209–259° C.; $n_D^{25}$, 1.4315–1.4552; 10 parts of still residue. |
| IV | | 197–198 | 1,670–1,750 | Rhodium(III) bis-benzoylacetonate monoacetate (1/2 of run). | 0.5 | do | | 200 parts diethyl ketone, B.P. 102 C.; $n_D^{25}$, 1.3902; 33 parts product, B.P. 103° C./1 atm.—53° C./1.5 mm.; $n_D^{25}$, 1.4238; 54 parts 3,6-octanedione, B.P. 61° C./0.1 mm., M.P. 29.5–31.5° C.; 5 parts cyclic unsaturated ether, B.P. 65–85°C./0.06 mm.; $n_D^{25}$, 1.4787. |
| | | | | Rhodium(III) bis-(dibenzoylmethanate) monoacetate (1/2 of run). | 0.5 | | | |

Table 1—Continued

| Example | CO Pressure, Atm. | Temp., °C. | Total Pressure Drop, Atm. | Catalyst | | Ethylenically Unsaturated Compound | | Reaction Products |
|---|---|---|---|---|---|---|---|---|
| | | | | Nature | Parts | Nature | Parts | |
| V | 1,000 | 190 | 580 | Rhodium(III) acetylacetonate. | 1 | Propylene. | 84 | 17 parts isobutyraldehyde, B.P. 58–71° C.; $n_D^{25}$, 1.3729; 2,4-dinitrophenylhydrazone, M.P. 182° C.; 55 parts dipropyl ketones consisting of approximately equal amounts of diisopropyl ketone; 2,4-dinitrophenyl-hydrazone, M.P. 87–88° C.; n-propyl-isopropyl ketone and di-n-propyl-propyl ketone, B.P. 129–144° C.; $n_D^{25}$, 1.3978–1.4035; approximately 3 parts isobutyric acid. |
| VI | 650–950 | 160–200 | 380 | Rhodium (III) ethyl acetoacetate chelate. | 0.5 | ---do------- | 84 | 17 parts isopropyl alcohol, B.P. 77–79.5° C.; $n_D^{25}$, 1.3784; 20 parts diisopropyl ketone, B.P. 129–134.5° C.; $n_D^{25}$, 1.4005; 16 parts 2-methylhexanone-3, B.P. 136–138° C.; $n_D^{25}$, 1.4026; 16 parts di-n-propyl ketone, B.P. 141–142° C.; $n_D^{25}$, 1.4042; 3 parts still residue. |
| VII | 750–950 | 183–190 | 920 | Bis(2-pyridinealdehyde) Rhodium (III) chloride. | 0.36 | ---do------- | 84 | 14 parts isopropyl alcohol, B.P. 83° C.; $n_D^{25}$, 1.3870; 33 parts isobutyl alcohol, B.P. 107–111.5° C.; $n_D^{25}$, 1.3950; 40 parts mixture of isomeric propyl ketones, B.P. 126–144° C.; $n_D^{25}$, 1.3990–1.4021; 10 parts of mixture of normal and isobutyric acids, B.P. 65–80° C./20 mm.; $n_D^{25}$, 1.3998. |
| VIII | 925 | 190 | 105 | Ruthenium (III) acetylacetonate. | 1 | ---do------- | 84 | 9 parts of a mixture of three isomeric propyl ketones; $n_D^{25}$, 1.4040; 3 parts higher boiling products. |
| IX | 645–985 | 175 | 125 | Palladium (II) acetylacetonate. | 0.03 | ---do------- | 84 | 40 parts propylene and 95 parts carbonyl compound containing distillate; $n_D^{25}$, 1.3338. |
| X | 960 | 175 | 5 | Palladium-5,8-diaza-4,9-dimethyl-4,8-dodecadiene-2,11-dione chelate. | 0.3 | ---do------- | 86 | 50 parts propylene and 96 parts carbonyl group containing distillate; $n_D^{25}$, 1.3326. |
| XI | 600–990 | 100–200 | 260 | Rhodium (III) acetylacetonate | 0.5 | 1,5-Hexadiene. | 70 | 30 parts heptyl alcohol, B.P. 172–177° C.; $n_D^{25}$, 1.4262; 11 parts $C_{13}$ primary alcohols, B.P. 267° C.; $n_D^{25}$, 1.4536, M.W., 215; and 26 parts still residue. |
| XII | 800–1,000 | 185–210 | 235 | -----do----------- | 0.5 | 1,4-Hexadiene. | 52 | 40 parts heptyl alcohol, B.P. 160–172° C.; $n_D^{25}$, 1.4198–1.4227; 6 parts $C_{13}$ primary alcohols, B.P. 270° C.; $n_D^{25}$, 1.4543; 13 parts still residue, and 61 parts water. |
| XIII | 960 | 200 | 110 | -----do----------- | 0.5 | ---do------- | 61 | 7 parts 1,4-hexadiene; 6 parts 2,4-hexadiene; 14 parts linear unsaturated ester, B.P. 80–122° C./1 mm.; $n_D^{25}$, 1.4821; Sap. Eq. 314.6; and 165 parts high boiling material. |
| XIV | 800–1,000 | 181–210 | 50 | -----do----------- | 0.5 | 1,5-Hexadiene. | 70 | 10 parts hexenes, B.P. 67° C.; $n_D^{25}$, 1.3918; 20 parts unsaturated ester, B.P. 215–249° C.; $n_D^{25}$, 1.4828–1.4872; and 6.5 parts still residue. |
| XV | 700 | 190 | 310 | -----do----------- | 0.5 | Butadiene. | 108 | 32 parts rubbery polymeric solid; 110 parts distillate of which 50 parts had B.P. 129–172° C.; $n_D^{22}$ 1.4462–1.4872 and was a mixture of esters, ketones, and aromatic compounds; 31 parts still residue. |
| XVI | 825–950 | 225 | 145 | -----do----------- | 0.5 | Butene-2 | 84 | 14 parts of an acetal, B.P. 128–135° C.; $n_D^{25}$, 1.4000, strong Fuchsin Reagent test; 8 parts of dibutyl ketone, B.P. 177–186° C.; $n_D^{25}$, 1.4162; 3 parts higher boiling products and 4 parts still residue. |
| XVII | 950 | 255 | 225 | -----do----------- | 0.5 | 2,4-Hexadiene. | 42 | 21 parts carbonyl group containing material, $n_D^{25}$, 1.4082; 2.5 parts liquid, B.P. 50–53° C./2 mm.; $n_D^{25}$, 1.4468 which is a mixture of an ester and a ketone; and a ketone, B.P. 74–122° C./1 mm.; $n_D^{25}$, 1.4698. |
| XVIII | 1,000 | 210 | 100 | -----do----------- | 0.5 | Isobutylene. | 112 | 60 parts isobutylene; 90 parts of distillate boiling from 31° C./200 mm. to 43° C./2 mm., from which 24 parts of material is chiefly methyl isovalerate. |
| XIX | 600–990 | 170–210 | 1,265 | Ruthenium (III) acetylacetonate | 0.5 | Allylamine. | 100 | 49 parts distillate, B.P. 25° C./40 mm.; $n_D^{25}$, 1.3674; 80 parts distillate, B.P. 25° C./40 mm. to 128° C./2 mm., from which 55 parts mixture of lactams, B.P. 158–242° C., $n_D^{25}$, 1.4300–1.4550, was obtained and from which lactams corresponding to $C_6H_{13}NO$, $C_8H_{18}NO$, $C_5H_{18}NO$, $C_5H_{10}NO$, $C_3H_7NO$, and $C_{3.5}H_7NO$ were isolated; 24 parts butyrolactam, B.P. 260–262° C.; $n_D^{25}$, 1.4780. |
| XX | 800–1,000 | 176–200 | 860 | Rhodium (III) acetylacetonate. | 0.5 | Diallylamine. | 75 | 20 parts mixture of substituted pyridines and amides, B.P. 172–200° C.; $n_D^{25}$, 1.4552, N.E., 186; 20 parts substituted butyrolactam, boiling from 200–224° C.; $n_D^{25}$, 1.4668; 16 parts 5-allyl-4-pyrrolin-2-one, B.P. 232° C.; $n_D^{25}$, 1.5020 (C, 65.19%, H, 9.46%, N, 10.74%, took up 0.01325 g. $H_2$/g. sample); 49 parts still residue. |
| XXI | 800–950 | 200 | 185 | -----do----------- | 0.5 | Methyl acrylate. | 82 | 68.5 parts methanol; $n_D^{25}$, 1.3350; 71 parts dimethyl succinate, B.P. 53–55° C./2 mm.; $n_D^{25}$, 1.4265, Sap. Eq. 78.2; 11 parts distillate (saturated and unsaturated esters), B.P. 123° C./2 mm.; M.P. 43–44° C., Sap. Eq. 94.7; 35 parts still residue. |
| XXII | 800–1,000 | 190 | 1,145 | -----do----------- | 0.5 | ---do------- / Ethylene | 82 / 56 | 11 parts methyl gamma-ketocaproate, B.P. 210° C.; $n_D^{25}$, 1.4235; 11 parts dimethyl gamma-ketopimelate; $n_D^{25}$, 1.4460, Sap. Eq., 90; 45 parts of material consisting largely of diethyl ketone; and 98 parts of unidentified residue. |
| XXIII | 975 | 210 | 135 | Ruthenium (III) acetylacetonate. | 0.5 | Methyl acrylate | 82 | 74 parts methanol; $n_D^{25}$, 1.3340; 12 parts of a mixture of methanol and methyl acrylate; $n_D^{25}$, 1.3494; 10.6 parts distillate boiling at 130–138° C./3 mm. which partly crystallized on standing. The liquid remaining had a Sap. Eq. of 84.6 and by infrared was shown to be an unsaturated ester containing a methyl group alpha to the carbonyl group. The solid had a Sap. Eq. of 90 and was shown by infrared to contain a carbonyl group; there was also obtained 66 parts of still residue. |
| XXIV | 900–990 | 211 | 870 | -----do----------- | 0.5 | ---do------- / Ethylene | 52 / 56 | 24 parts diethyl ketone, B.P. 96–101° C.; $n_D^{25}$, 1.3886; 15 parts methyl gamma-keto-caproate, B.P. 198–212° C. (corr.); $n_D^{25}$, 1.4240, Sap. Eq. 113; 1.2 parts dimethyl fumarate, M.P. 100–101° C.; Sap.Eq. 69.2; 20 parts dimethyl gamma-ketopimelate, B.P. 290–298° C. (corr.); $n_D^{25}$, 1.4476; 10 parts of esters, B.P. 298–315° C. (corr.), $n_D^{25}$, 1.4607. |
| XXV | 800–950 | 140 | 440 | -----do----------- | 1 | Allene | 40 | 36 parts of light yellow solid polymer, 28 parts of methyl methacrylate; $n_D^{25}$, 1.4096; and 13 parts of material shown by infrared to be an ester. |

Table 1—Continued

| Example | CO Pressure, Atm. | Temp., °C. | Total Pressure Drop, Atm. | Catalyst Nature | Catalyst Parts | Ethylenically Unsaturated Compound Nature | Ethylenically Unsaturated Compound Parts | Reaction Products |
|---|---|---|---|---|---|---|---|---|
| XXVI | 950–975 | 189 | 105 | Chelate of palladium with 5,8-diaza-4,9-dimethyl-4,8-dodecadiene-2,11-dione. | 0.5 | Allene | 40 | 18 parts tan polymer; 94 parts of liquid shown by infrared to contain methyl methacrylate; and 13 parts still residue. |
| XXVII | 900–990 | 143 | 300 | Rhodium(III) acetylacetonate. | 0.75 | ---do------ | 40 | 62 parts of polymer, 14 parts of liquid products shown by infrared to contain methyl methacrylate. |

In the process of this invention, there can be used any ethylenically unsaturated compound. Suitable compounds include ethylene, propylene, butene-1; butene-2; octenes; octadecene; 2-methylpropene; 1,3-butadiene; 2-methyl-1,3-butadiene; 2,3-dimethyl-1,3-butadiene; cyclohexene; methylcyclohexene; styrene; methylstyrene; vinylcyclohexene; 3,3-dimethyl-1-butene; 1,4-hexadiene; 2,4-hexadiene; 1,5-hexadiene; 2-methyl-1,4-hexadiene; acrolein; methyl vinyl ketone; allyl alcohol; 2-phenylbutene; 2-cyclohexylbutene; allene; allylamine; diallylamine; acrylonitrile; methyl acrylate; vinyl chloride; etc. A preferred group of ethylenically unsaturated compounds are those represented by the general formula

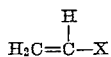

$$H_2C=C-X$$
$$\phantom{H_2C=C}|\phantom{-X}$$
$$\phantom{H_2C=C}H$$

wherein X is hydrogen, halogen, nitrile, hydrocarbon, hydroxyalkyl, alkoxycarbonyl or aminoalkyl, and which have no more than 12 carbon atoms. Most preferred are the α-olefinic hydrocarbons having no more than 12 carbon atoms, i.e., having up to 12 carbons.

The second reactant in the process which may also serve as a liquid reaction medium is a hydroxylic compound. Water and the aliphatic alcohols are suitable for this purpose. More particularly, water and the monohydric alkanols (including cycloalkanols) containing up to 8 carbon atoms are preferred. Examples of such compounds include methanol, ethanol, butanol, hexanol, cyclohexanol, methylcyclohexanol and the like.

The third reactant is carbon monoxide. Proportions of the three reactants, namely, the olefin, carbon monoxide and the normally liquid hydroxylic compound, will ordinarily vary on a molar ratio basis from 1:0.1:0.1 to 1:5:15.

The catalysts used in the process of this invention are chelates of noble metals of group VIII, namely, ruthenium, rhodium, platinum, palladium, osmium and iridium. These chelates have one or more rings and are formed by the reaction of a metal ion with a ligand containing more than one donor group. A chelating structure or chelate-forming structure is a polydentate group and usually a bidentate group and contains at least two (preferably only two) donor groups, said donor groups being so situated with respect to each other that formation of a chelate ring, preferably a chelate ring of 5 to 6 atoms, is possible. The preferred donor groups are those which include oxygen, nitrogen, or sulfur as the donor atom. These groups are well known in chelate chemistry, the principal ones being enolic hydroxyl and alcoholic hydroxyl, —OH; carbonyl, =CO; alkoxycarbonyl, —COOR; amino; thioalcohol, —SH; thiocarbonyl, =CS; etc. Some of these groups may form covalent bonds and other coordinate bonds with the metal which is part of the chelate ring. Examples of chelating structures (or polydentate groups) include the following well-known ones, which can be attached to the rest of the polyligand molecule in any suitable manner; 1,3-diketones, e.g., acetylacetone, propionylacetone, butyroylacetone, nonanoylacetone, benzoylacetone, bis-benzoylmethane, etc.; α- and β-keto acids and esters, e.g., α-keto-glutaric acid, oxalacetic acid, pyruvic acid, ethyl acetoacetate, butyl acetoacetate, etc.; amine carbonyl compounds; such as aldehydes and ketones, e.g., 2-pyridine aldehyde, 5,8-diaza-4,9-dimethyl-4,8-dodecadiene-2,11-dione; α- and β-mercaptocarboxylic acids and esters, e.g., thioglycolic acid, and esters thereof; diamines, particularly acyclic diamines, e.g., ethylene diamine; and the like.

The preferred chelates are those with 1,3-diketones because of their availability and good catalytic activity.

The following examples illustrate the production of the catalysts employed in Examples VII and IV respectively.

EXAMPLE A

BIS(2-PYRIDINEALDEHYDE)RHODIUM CHLORIDE

To a solution of 7.9 parts of rhodium trichloride trihydrate in 45 parts of water there was added, with stirring, 9.7 parts of 2-pyridinealdehyde. A solid precipitated and immediately dissolved. The temperature rose from 25° C. to 46° C. The solution was chilled overnight and filtered, and the solid on the filter was washed with water and air-dried. There was obtained 0.7 part of a pale, dull-yellow powder. An aqueous solution gave no precipitate with aqueous silver nitrate at room temperature, but did give a precipitate on heating. The product analyzed 24.31% rhodium. The calculated rhodium content for Rh(2-pyridinealdehyde)$_2$Cl$_3$ is 24.30%. The yield of product was 6%.

EXAMPLE B

RHODIUM BIS(DIBENZOYLMETHANATE) MONOACETATE

Solutions of 5.3 parts of rhodium trichloride trihydrate in 40 parts of water, 8.2 parts of sodium acetate trihydrate in 40 parts of water, and 14 parts of dibenzoylmethane in 79 parts of warm absolute alcohol were mixed, and the mixture refluxed for two hours with stirring. The reaction mixture was cooled thoroughly, filtered, and the solid washed with water and air-dried. There was obtained 15.5 parts of crude product which was precipitated by dissolving it in 132 parts of benzene, filtering to remove traces of undissolved material, and adding 495.2 parts of hexane to the filtrate. The yield of product was 5.5 parts. Analysis of the product showed it to contain 16.94% rhodium. The calculated rhodium content of Rh(C$_6$H$_5$COCHCOC$_6$H$_5$)$_2$OAc is 17.00%.

Rhodium bis(benzoylacetonate) monoacetate was prepared in the same way as described above from benzoylacetone.

The chelates of the group VIII noble metals which are soluble in the reaction mixture are preferred because of their greater effectiveness in promoting the desired reaction. The amount of catalyst employed ordinarily will be from 0.00001 to 0.1 mole per mole of ethylenically unsaturated compound charged to the reactor, although larger amounts may be used if desired.

This invention may be practiced by heating the reactants batchwise, semi-continuously, or continuously in any suitable pressure-resistant vessel, e.g., an autoclave or in a tubular converter, preferably lined with an inert material such as glass, porcelain, silver, etc. In a continuous process, the reactants may be introduced at one or more points within the reaction vessel. In certain instances, it is better to employ a tubular reactor in which temperature and pressure are not uniform throughout the length of the vessel.

The reaction of the olefin, carbon monoxide, and water is conducted in the presence of the aforesaid catalysts at temperatures which are above 100° C. and pressures which are in excess of 100 atmospheres. Generally, there is no merit in using temperatures and pressures above 350° C. and 3000 atmospheres and these represent practical operating upper temperature and pressure limits. Since outstanding results are realized using temperatures of 150–300° C. and pressures of 500–2500 atmospheres, these embrace the conditions most generally employed. Ordinarily the temperature and pressure of the reaction are maintained for from 30 minutes to 30 hours.

Use of the chelates of ruthenium, rhodium, platinum, osmium, iridium, and palladium as catalysts for the reaction of olefins with carbon monoxide and hydroxylic solvents, offers a particularly advantageous route to such compounds as 3,6-octanedione from ethylene, dipropyl ketones from propylene, pyrrolidone from allylamine, methyl γ-ketocaproate and dimethyl γ-ketopimelate from methyl acrylate, and the like. Many of these desirable compounds have been obtained only by involved synthesis in the past and this process offers an economical and efficient step forward in these syntheses.

What is claimed is:

1. A process for preparing oxygenerated organic compounds comprising reacting, as the sole reactants, carbon monoxide, an ethylenically unsaturated compound, and a liquid hydroxylic compound selected from the group consisting of water and aliphatic alcohols in the presence of a catalytic amount of a group VIII noble metal chelate at a temperature above 100° C. and a pressure above 100 atmospheres.

2. The process of claim 1 wherein the hydroxylic compound is water.

3. The process of claim 1 wherein the hydroxylic compound is an alkanol of up to 8 carbons.

4. A process for the preparation of oxygenated or-organic compounds comprising reacting, as the sole reactants, carbon monoxide, an alkanol of up to 8 carbons, and an ethylenically unsaturated compound of up to 12 carbons and of the formula

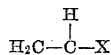

wherein X is selected from the group consisting of hydrogen, halogen, cyano, hydrocarbyl, hydroxyalkyl, alkoxycarbonyl, and aminoalkyl, in the presence of at least 0.00001 mole of group VIII noble metal chelate per mole of said unsaturated compound at a temperature above 100° C. and a pressure above 100 atmospheres.

5. A process for preparing oxygenated organic compounds comprising reacting, as the sole reactants, carbon monoxide, water, and an ethylenically unsaturated compound of up to 12 carbons and of the formula

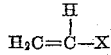

wherein X is selected from the group consisting of hydrogen, halogen, cyano, hydrocarbyl, hydroxyalkyl, alkoxycarbonyl, and aminoalkyl, in the presence of at least 0.00001 mole of a group VIII noble metal chelate per mole of said unsaturated compound at a temperature above 100° C. and a pressure above 100 atmospheres.

6. The process of claim 1 wherein the hydroxylic compound is methanol.

7. The process of claim 4 wherein said chelate is a chelate of a 1,3-diketone.

8. The process of claim 4 wherein said unsaturated compound is an olefinic hydrocarbon.

9. The process of claim 4 wherein the alkanol is methanol.

10. The process of claim 4 wherein the alkanol is methanol and said unsaturated compound is an olefinic hydrocarbon.

11. The process of claim 4 wherein carbon monoxide, methanol, and an olefinic hydrocarbon of up to 12 carbons are reacted in the presence of a group VIII noble metal acetylacetonate.

12. The process of claim 5 wherein said chelate is a chelate of a member of the group consisting of 1,3-diketones, α- and β-keto acids and esters, amine aldehydes, α- and β-mercaptocarboxylic acids and esters, and diamines.

13. The process of claim 5 wherein said chelate is a chelate of a 1,3-diketone.

14. The process of claim 5 wherein said unsaturated compound is an olefinic hydrocarbon.

15. The process of claim 5 wherein said unsaturated compound is an olefinic hydrocarbon and said chelate is a chelate of a 1,3-diketone.

16. The process of claim 5 wherein said unsaturated compound is an olefinic hydrocarbon and said chelate is a group VIII noble metal acetylacetonate.

17. The process of claim 12 wherein said unsaturated compound is an olefinic hydrocarbon.

18. The process of claim 1 wherein the ethylenically unsaturated compound contains up to 12 carbons and is represented by the formula

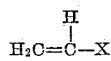

wherein X is selected from the group consisting of hydrogen, halogen, cyano, hydrocarbyl, hydroxyalkyl, alkoxycarbonyl and aminoalkyl.

19. The process of claim 1 wherein the ethylenically unsaturated compound is a terminally unsaturated olefinic hydrocarbon having no more than 12 carbon atoms.

20. The process of claim 1 wherein the ethylenically unsaturated compound, carbon monoxide and the liquid hydroxylic compound are reacted in the following range of molar proportions respectively: 1:0.1:0.1 to 1:5:15.

21. The process of claim 4 wherein said chelate is a chelate of a member of the group consisting of 1,3-diketones, α- and β-keto acids and esters, amine aldehydes, α- and β-mercaptocarboxylic acids and esters, and diamines.

References Cited in the file of this patent

UNITED STATES PATENTS

| | | |
|---|---|---|
| 2,542,767 | Gresham et al. | Feb. 20, 1951 |
| 2,564,104 | Gresham et al. | Aug. 14, 1951 |
| 2,578,144 | McMillan | Dec. 11, 1951 |
| 2,593,440 | Hagemeyer | Apr. 22, 1952 |
| 2,801,263 | Hasek et al. | July 30, 1957 |
| 2,839,580 | Hughes et al. | June 17, 1958 |
| 2,863,911 | Buchner et al. | Dec. 9, 1958 |
| 2,871,262 | Benson | Jan. 27, 1959 |
| 2,876,254 | Jenner et al. | Mar. 3, 1959 |

OTHER REFERENCES

Martell et al.: "Chemistry of the Chelate Compounds," 1952, pp. 245–248, 549 and 558.

UNITED STATES PATENT OFFICE
CERTIFICATE OF CORRECTION

Patent No. 3,040,090            June 19, 1962

Thomas Alderson et al.

It is hereby certified that error appears in the above numbered patent requiring correction and that the said Letters Patent should read as corrected below.

Column 7, line 27, for "oxygenerated" read -- oxygenated --; lines 44 and 45, the formula should appear as shown below instead of as in the patent:

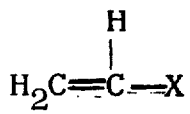

column 8, line 39, for "aminoelkyl" read -- aminoalkyl --; line 43, beginning with "20. The process of claim 1" strike out all to and including "1:0.1:0.1 to 1:5:15." in line 46, same column 8; line 47, the claim now numbered "21" should be renumbered as claim -- 20 --; in the heading to the printed specification, line 9, for "21 Claims" read -- 20 Claims --.

Signed and sealed this 20th day of November 1962.

(SEAL)
Attest:

ERNEST W. SWIDER            DAVID L. LADD
Attesting Officer            Commissioner of Patents